INVENTOR
BERT EARLEY

INVENTOR
BERT EARLEY
By Jacobs & Jacobs
ATTORNEYS

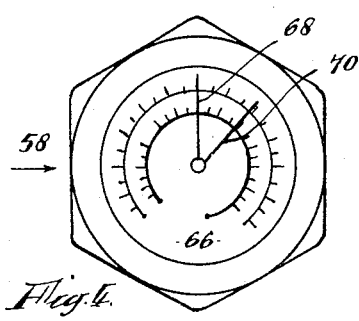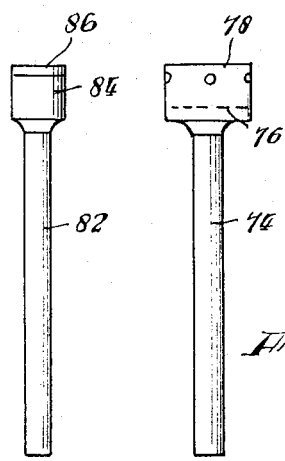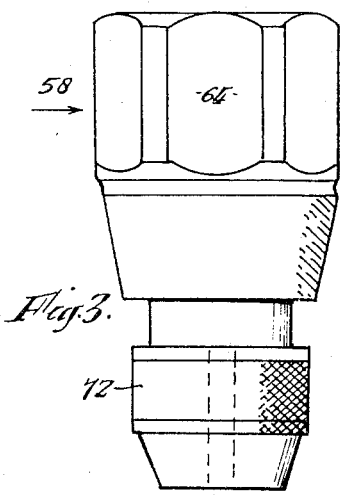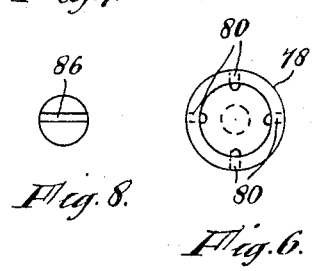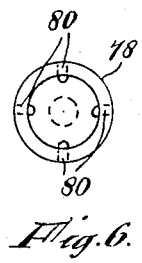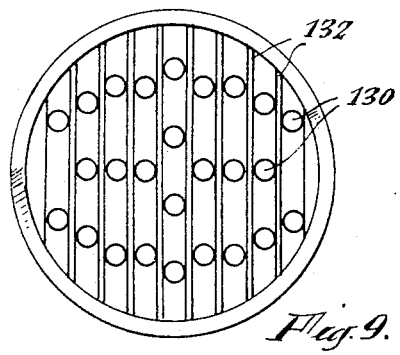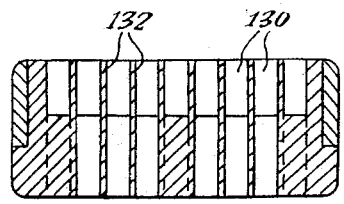

United States Patent Office 3,440,533
Patented Apr. 22, 1969

3,440,533
PORTABLE POTENTIOMETRIC RECORDER TESTING AND CALIBRATING DEVICE
Bert Earley, Bristol, England, assignor to Central Electricity Generating Board, London, England, a company of Great Britain
Filed Apr. 1, 1966, Ser. No. 546,471
Int. Cl. G01r 15/12, 35/04, 11/32
U.S. Cl. 324—73                                                     7 Claims

ABSTRACT OF THE DISCLOSURE

Portable testing equipment for testing the functioning of single and multi-point potentiometric recorders, comprising in combination, a voltage divider having a plurality of outputs, all of which differ from each other in a defined known manner, the voltage range of these outputs covering the voltage range of the multi-point recorder to be tested; means for varying the range of the voltage outputs of said divider; a multi-lead cable, one end of each lead being connected to an output of the divider; a housing provided at the other end of the cable for separately housing the other end of each lead, said housing being constructed so that the leads can be extracted therefrom for simultaneously connecting a desired plurality of outputs to the input channels of the recorder under test; a micro-volt output device, the output of which is fed into the amplifier of the recorder for testing the servo-system of the recorder; a tube tester for testing the electron emission of amplifier tubes used in the recorder under test; a converter testing unit having a socket for receiving and testing the converter of the recorder for the percentage of contact dwell; a contact pressure testing device which is demountable from the device for making a test; a torque tester comprising a chuck, a dial and a memory needle; a plurality of interchangeable torque bars, one of which is coupled to a suitable point of the recorder mechanism, the torque required for rotating the mechanism indicating the friction of the system; and a constant voltage unit testing means comprising at least a pair of resistors, one being of larger value than the other, connected across the output from the constant voltage of the recorder, the values of the resistors being such that the voltage across the resistor of smaller value can be read by balancing a potentiometer with the aid of a galvanometer.

---

This invention relates to recorder testing and calibrating devices for testing potentiometric recorders. Such recorders are in general built into an instrumentation panel. The method employed today of testing such a recorder is any one of the following three.

(a) To remove the recorder completely and take it to an instrument workshop for testing. This involves making numerous disconnections of the terminal type each of which has to be undone individually. Such recorders may have up to twenty-four inputs in addition to the mains input and limit devices to protect the device being monitored. In my experience it takes anything up to an hour to remove a recorder from an instrument panel and great care has to be taken not to damage adjacent instrumentation. Usually such recorders require two men partly because of their weight but also to guard adjacent equipment. In my view it would be a practical impossibility for a man on his own to remove a recorder without grave risk of causing damage. Obviously this operation involves the expenditure of considerable time and labor which all has to be repeated when the instrument is replaced. Handling the recorder after it has been workshop tested and reset is also undesirable as it can cause damage to the recorder in which case the "whole process" has to be repeated. All this time the apparatus being monitored cannot be used.

(b) The next method is to bring the test equipment to the recorder. To do a thorough and complete test involves bringing numerous and often bulky items of test equipment to the instrument panel and carry out each test in situ. The objection to this method is that for making each test the equipment is usually bulky because it is designed to cover a much wider range than is necessary for the particular test to be applied. Take for example a simple valve test; the valves on recorders all have substantially the same thermionic characteristics whereas a valve tester is designed for use with a range of valves of widely varying characteristics.

(c) Instead of doing a complete removal of an in situ test certain parts of the recorder may be removed for testing but the test equipment may be located at a remote point of the plant. With this mehod only selected parts are tested and a fault may exist in a part not so tested or tested part may go faulty again when refitted or be damaged in transit. It will be seen from the above that a problem has existed for a considerable period of time and to my knowledge has existed since about 1945.

One of the objects of the present invention is to provide a recorder testing and calibrating device which will overcome some or all of the disadvantages inherent in the test methods now currently used as set out above.

According to the present invention there is provided a potentiometric recorder testing device comprising a plurality of voltage outputs from a voltage divider all of which vary from each other in a known manner, said voltage range covering the voltage range of the recorder to be tested and means for varying the range of voltage output of said divider.

The device may include a potentiometer for providing a range of standard voltages within the range of the recorders to be calibrated and reading voltage inputs in a constant voltage unit testing means. A micro-volt output device may be provided for testing the servo system of the recorder for example in the range ±0 to 40 μv. A valve tester may be embodied including a plurality of valve sockets connected in parallel, each socket being suited to one of the several types of valve bases normally encountered in recorders. Similarly a plurality of sockets for converters may be provided. Other tests required relate to contact pressures and torque and such appliances may likewise be incorporated with the device. A constant voltage unit testing means may be provided embodying at least one pair of resistors of different values connected across the unit the sum of their values being equal to that of the measuring unit and the voltage across the smaller being readable by the potentiometer. Where several pairs are provided selector means are also provided.

The present invention will now be described in greater detail by way of example with reference to the accompanying drawings wherein:

FIGS. 3 and 4 are respectively an elevation and end view of the torque tester embodied in the device;

FIGS. 5 and 6 are respectively a side view and an end view of a preferred torque bar for the torque tester;

FIGS. 7 and 8 are respectively a side view and an end view of a preferred torque bar for testing the chart drive system;

FIGS. 9 and 10 show respectively a plan and sectional elevation view of a housing for holding spare leads.

For practical purposes nine checks are needed to test and calibrate a potentiometric recorder completely. These are as follows:

(1) Test the pressure of slide wire contacts.
(2) Measure the balancing system for excessive friction.
(3) Measure the chart drive and associated mechanisms for excessive friction.
(4) Test the converter for percentage of contact dwell.
(5) Test the emission of amplifier valves.
(6) Carry out a performance test on the servo-system.
(7) Calibrate the constant voltage unit.
(8) Carry out a normal field calibration of the recorder.
(9) Check the complete working, switching and printing action of multi-point recorders.

Figure 1:
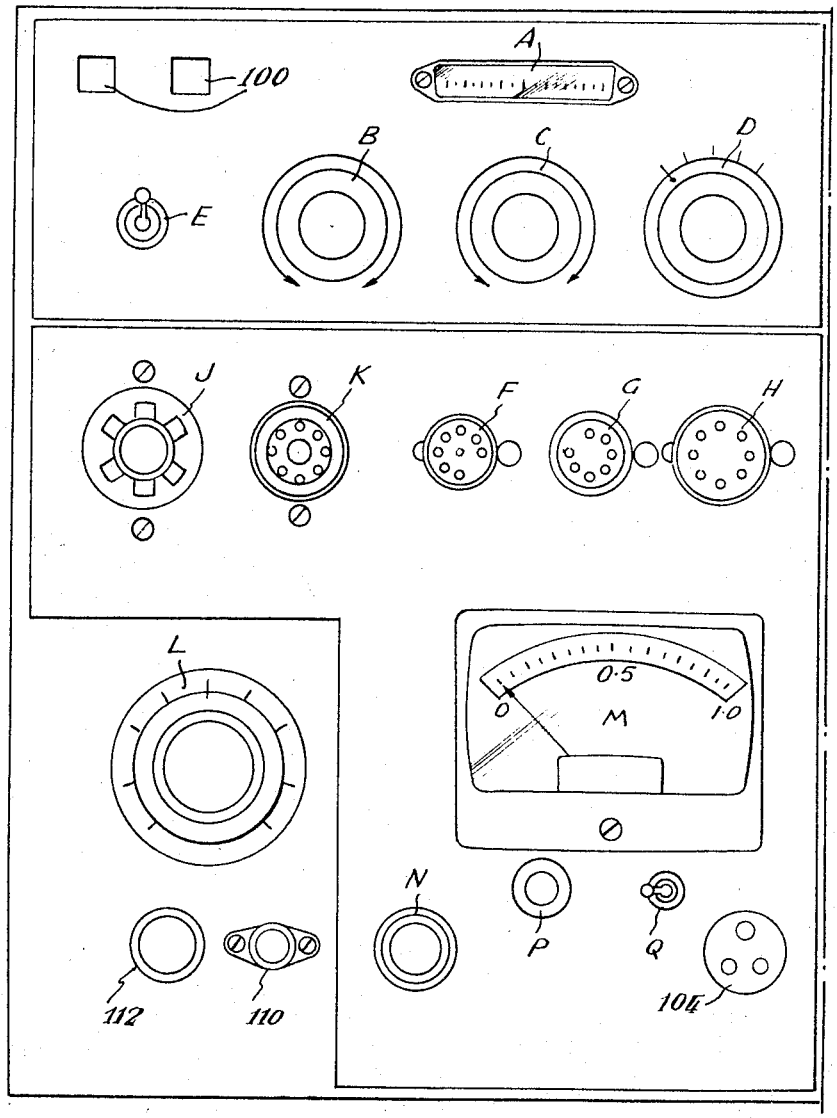
FIGS. 1 and 1A are diagrammatic views of a preferred form of a potentiometric recorder testing device.
Figure 1A:
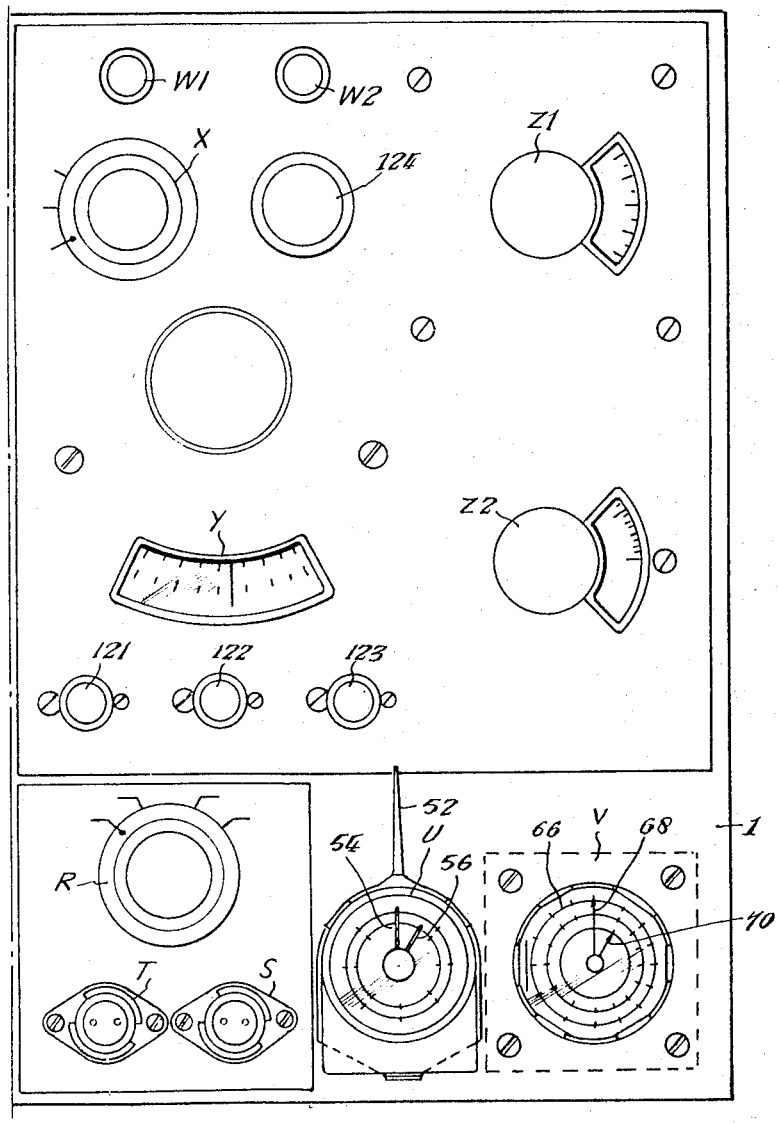

Referring first to FIG. 1 of the drawings, the potentiometric recorder testing device is housed within a light but strong case, the front panel 1 of which is shown. The panel 1 is provided with the following switches, controls and other accessories:

A thirty-six output line socket A.

Fine and coarse adjustment control knobs B and C respectively for controlling the millivolt output from the device.

A four position switch D for selecting three different ranges of output. The positions are: 1st—off, 2nd—0.5 to 12.5 mv., 3rd—1 to 25 mv., 4th—2 to 50 mv.

An additional switch E for increasing the maximum range of output up to 100 mv.

Three tube sockets F, G and H for testing the different types of tubes used in the recorder. Additional tube bases may be provided where necessary.

Two alternative sockets J and K for checking a test converter, the unit to be checked being inserted into one of the sockets.

A microvolt manual dial L having its zero in the center of its range and selecting from −40 μv. to +40 μv. for test purposes.

The dial L is provided for checking the performance of the servo-system to be tested which is connected to the socket 110 through a push button 112.

A milliammeter M which is connected in the cathode circuits of the tubes for measuring the anode currents of the tubes being tested, and the percentage of contact for the converter.

A full scale adjusting knob N and a push button P for adjusting the full scale deflection of the milliammeter M.

A left and right contact switch Q which is wired in circuit with the sockets J and K and is used in connection with the checking of a test converter, and also for checking each half of a double diode or double triode separately.

A four way switch R and input/output sockets S and T for use in checking the constant voltage unit. The output from the constant voltage unit is fed into the socket S, and the socket T is connected to the potentiometer embodied within the device. The switch R selects the appropriate range.

A tension gauge U for checking the pressure of slide wire contacts. The gauge U is demountable from the panel.

A torque tester V which is used for testing the effort required to move the balancing system and the chart drive systems.

Input/output sockets W1 and W2 which are connected to the potentiometer embodied within the device.

A three-way switch for selecting the scale for measurement, the 1st position being Off, the 2nd position being $x1$ and the 3rd being $x5$.

A galvanometer Y and two dials Z1 and Z2 respectively coarse and fine associated with the potentiometer.

Three push buttons and one knob respectively 121 to 124 which are labelled test, standard, short galvanometer and standardize, the push buttons and knob being associated with the control and operation of the potentiometer.

Figure 2:
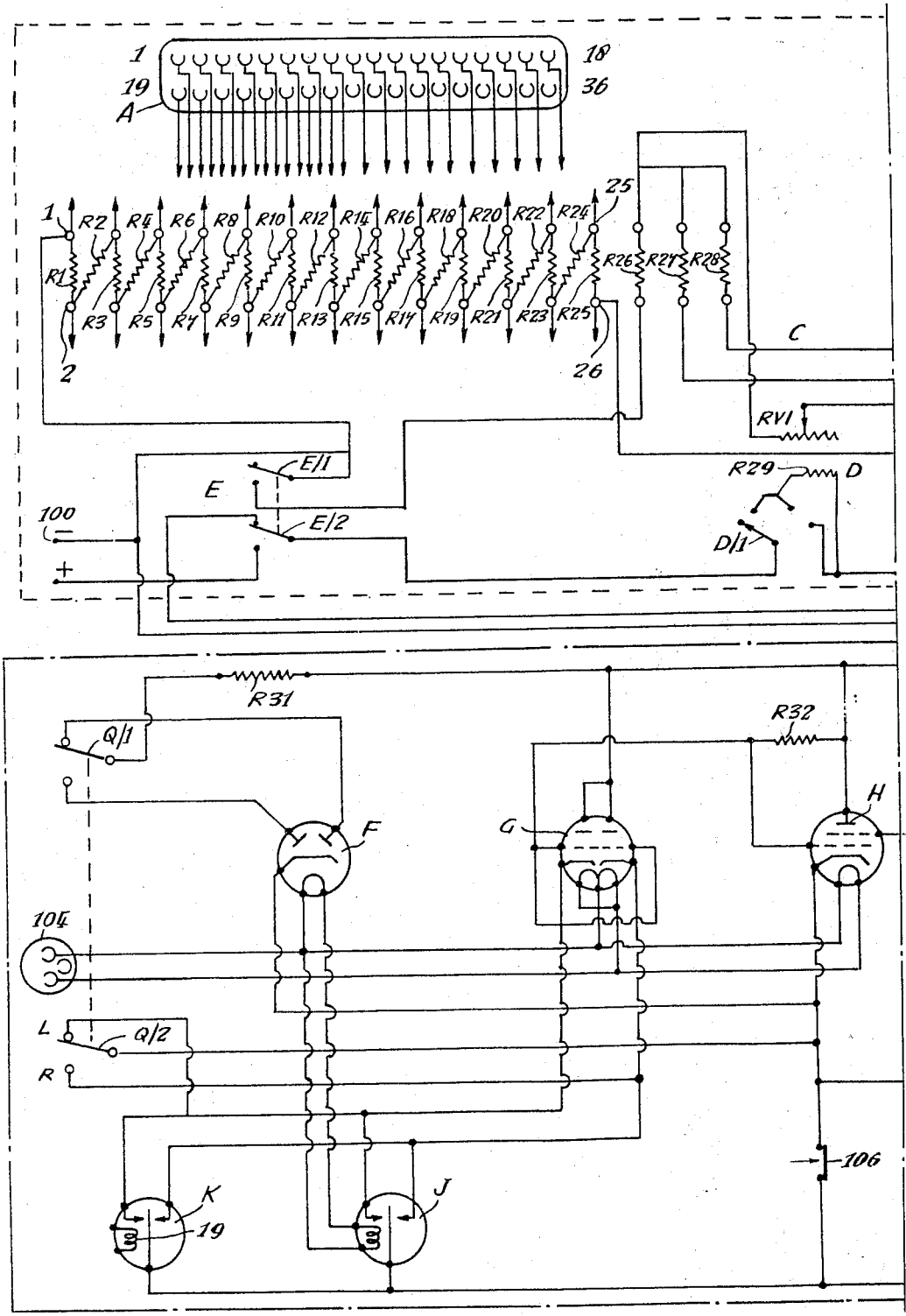
FIGS. 2 and 2A are circuit diagrams of the potentiometric recorder testing device.
Figure 2A:
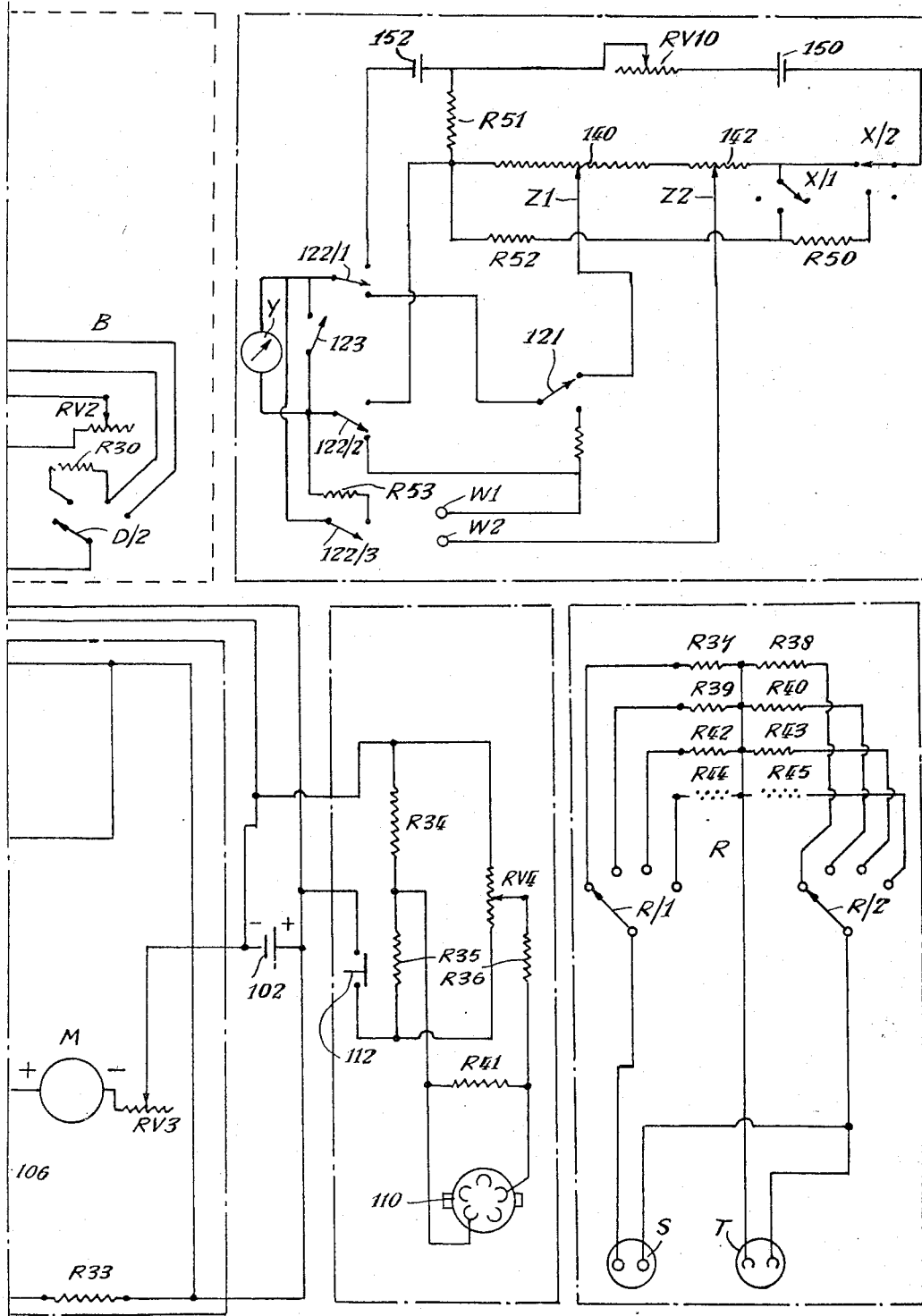

Referring now to FIG. 2, the various components of the potentiometric recorder testing device will now be described in greater detail with the aid of the circuit diagram. The thirty-six line output socket A is adapted to receive a complementary plug connected to a lead (not shown) each lead having a spade terminal for connecting to the recorder to be tested. Connected across twenty-six of the terminals of the socket A are twenty-five resistors R1 to R25, R1 being connected across the terminals 1 and 2; R2 being connected across the terminals 2 and 3 etc. Terminals 27 to 36 of the socket A are unconnected, these terminals being spare. The fine and coarse adjustment control knobs B and C are respectively connected to the sliders of variable resistors RV2 and RV1, whose maximum resistances are 75 ohms and 1K ohm. The four position switch D has two moving contacts D/1 and D/2, while the switch E has two moving contacts E/1 and E/2. In addition to the resistors R1 to R25, there are provided three resistors R26, R27 and R28 which are connected in circuit with the variable resistors RV1 and RV2. An external 3 volt battery is connected to the terminals 100. This battery is used solely for extending the normal range of the device in conjunction with the switch E. The main battery 102 for the potentiometric recorder testing device is a 1.5 volt standard dry cell. Its negative pole is connected to the moving contact E/1 and also to terminal 1 of the socket A. The positive pole is connected to the moving contact D/1 through the contact E/2 when in its normal position, i.e. when the 3 volt battery is not connected in the circuit. Terminal 26 of the socket A is connected to one end of the variable resistor RV2. The slider of the resistor RV2 is connected to the slider of the resistor RV1. One end of the resistor RV1 is connected to resistors R26, R27 and R28. The opposite ends of these resistors are respectively connected to: the negative pole of the battery 102 through the moving contact E/1 when the 3 volt battery is connected in circuit, the third and fourth terminals of the second part of switch D. The moving contact D/1 is connected to the moving contact E/2, while the moving contact D/2 is connected to the fourth terminal of the first part of the switch D and to the second and third terminals through a 1.8K ohm resistor R29. The second and third terminals of the second part of the switch D are interconnected through a 12K ohm resistor R30. This arrangement provides a selectable series of stepped voltages on the terminals 1 to 26, e.g. terminal 1 is at zero potential, terminal 2 at 2 mv. .... (in steps of 2 mv.) up to terminal 26 at 50 mv. when the switch D is in the fourth position.

In the valve tester part of the circuit, the negative pole of the battery is connected to the slider of a 250 ohm variable resistor RV3. One end of this variable resistor RV3 is connected to the negative terminal of the milliammeter M, whose positive terminal is connected to those terminals of the tube sockets F, G and H associated with the cathodes of the tubes to be tested. Socket F is for testing double diodes, socket G for double triodes and socket H for tetrodes and pentodes. The slider of the variable resistor RV3 is connected to the knob N for adjusting the full scale deflection of the milliammeter M.

For the purpose of adjusting the full scale deflection of the milliammeter M, a switch 106 operated by the push button switch P, connects the positive pole of the battery 102 to the milliammeter M through a 1.3K ohm resistor R33. An input socket 104 supplies 6.3 volts A.C. to the heater element terminals of the valve sockets F, G and H. The 6.3 volts supply is obtained from the recorder being tested. The positive pole of the battery 102 is connected to the anode terminals of the valve sockets G and H, and to one of the two anodes of the double diode socket F through a 2.7K ohm resistor R31 and the moving contact Q/1 of the left and right contact switch Q. The voltage to the grids of the tube sockets G and H is dropped by means of a 6.8K ohm resistor R32 while the screen grid for socket H receives the same potential as the anode does.

For the purpose of checking a test converter for percentage of contact dwell, the converter to be checked is connected to the appropriate socket J or K. These sockets are such that the vibrating contact of the converter is connected to the positive pole of the battery 102 through the resistor R33. The fixed contacts are alternately connected in circuit with the milliammeter M through the moving contact Q/2 of the left and right contact switch Q. The supply to the driving coil of socket J is obtained from the input socket 104, while that for the socket K is obtained from the supply to the converter being tested.

The next part of the circuit to be described concerns the testing of the performance of the servo-system. A voltage of ±40 μv. can be supplied to the socket 110 by means of a potentiometer divider circuit when the switch 112 is depressed. This circuit includes the following components: two series resistors R34 and R35, a potentiometer RV4 and resistors R36 and R41. The series resistors R34 and R35 each have a value of 4.7K ohms and are connected across the battery 102 through the switch 112. The potentiometer RV4 is connected across the resistors R34 and R35. The slider of this potentiometer RV4 which is mechanically connected to the dial L is connected to one output terminal of the socket 110 through the resistor R36 whose value of resistance is 68K ohms. The junction between the series resistors R34 and R35 is connected to the other output terminal of the socket 110 and to the first mentioned terminal of this socket through the resistor R41. This resistor R41 has a resistance of 4 ohms.

The circuit for checking the constant voltage unit includes the four way switch R and the input/output sockets S and T. The switch R has two moving contacts R/1 and R/2. One terminal of the input socket S is connected to the moving contact R/1, while the other is connected to the moving contact R/2 and to one terminal of the output socket T. Between each of the pairs of fixed contacts of the two parts of the switch R, there are connected a pair of series resistors respectively R37 and R38; R39 and R40; R42 and R43; and lastly R44 and R45. The resistor R37 has a value of 10 ohms and the resistor R38 has the value of 161 ohms. The values of resistors R39, R40, and R42–R45 are easily ascertainable by test. The values of these pairs or resistors are determined so as to give a 60 mv. output. The values of the pairs of resistors are so selected that in each case the sum of their values is equal to the resistance of the measuring circuit of the recorder. The junctions between each of these four pairs of resistors are interconnected and connected to the other terminal of the output socket T. The measurement is carried out by balancing the galvanometer Y with the aid of the dials Z1 and Z2 associated with the potentiometer. The potentiometer circuit is as follows:

It includes a potentiometer constructed in two parts 140 and 142 to provide the coarse and fine control. The slider of the two parts 140 and 142 are respectively connected to the dials Z1 and Z2. The terminal W2 is connected to the slider of the potentiometer 142, and the terminal W1 is connected to one side of the galvanometer Y through moving contact 122/2 of push button switch 122. The galvanometer can be short-circuited when not in use by operating push button 123. The slider of the potentiometer 140 is connected to the other side of the galvanometer through the moving contact 121/1 of the push button 121. To standardize the potentiometer the push button 122 is depressed which connects the main battery 150 in opposition with a standard cell 152 across the potentiometer, a variable resistor RV10 is adjusted by means of standardize knob 124 until the galvanometer Y reads zero. To alter the scale of the potentiometer the switch X is moved. This switch has two moving contacts X1 and X2. In the position shown (times 5) the potentiometer is connected directly to the negative pole of the battery 150. When in the (times 1) position, a resistor R50 is inserted in circuit. Resistors R51 and R52 are provided for the initial balancing of the system. In the test position, i.e. when the push button 122 is depressed, a damping resistor R53 is shunted across the galvanometer by means of moving contact 122/3.

The tension gauge U is provided with a finger 52 for lifting the slide wire contacts of recorders. The load required to lift the contact is indicated by the finger 54 and a memory finger 56 which stays put when the load is released and the finger 54 returns to the zero position.

The torque tester V (FIGURES 1 and 3 to 8) is likewise removably mounted on the panel for testing the effort required to move the balancing system and the chart drive systems respectively.

The torque bars (FIGURES 5 and 6) for coupling the torque tester to the requisite shaft are housed at the back of the testing device.

As will be seen from FIGURES 3 and 4 the bi-directional torque tester V has an octagonal head 64 which is recessed and fitted with a dial 66 over which are movable a needle 68 coupled to the torque testing instrument housed in the head 64 and a memory needle 70, the dial being calibrated in ounce-inches. The shaft of the measuring instrument carries a chuck 72 adapted to receive the torque bar. For testing the chart drive system a torque bar (FIGURES 5 and 6) made of brass has a shaft 74 the head 76 of which is recessed to form a flange 78 fitted with four internally projecting round headed pins 80 of such a length that the head can be slid over the unused end of the motor sprocket with the heads engaged with the teeth. The other torque bar shown in FIGURES 7 and 8 for testing the friction in the balancing motor system has a shaft 82 with a head 84 provided with a blade 86 for engagement with the slot normally provided in the end of the balancing motor shaft.

The nine tests referred to above are carried out as follows:

(1) To test the pressure of the slide wire contacts of a recorder, the gauge U is demounted from the panel 1. The finger 52 is inserted under the contact and lifted. The load required to lift the contact is indicated on the needle 54, the needle 56 moving therewith to act as a memory when the contact is released. With certain types of recorder it may be more convenient to use the height of contact gauge which is contained in the rear compartment.

(2 and 3) To measure the friction of the balancing system, chart drive and associated mechanism, the torque tester V is removed from its housing, the appropriate torque bars are coupled to the tester for measuring the friction of the system concerned. The torque tester V is then gently rotated until the shaft of the mechanism to which the tester is coupled begins to rotate. The memory needle 70 indicates the torque required to drive the mechanism of the recorder when the tester is uncoupled.

(4) To test the converter for percentage of contact dwell, the recorder to be tested is plugged into either socket J or K, and driving coil voltage is obtained either from the recorder in the case of socket J or from the supply to the converter in the case of socket K. With the milliammeter M adjusted to full scale deflection, the right and left switch Q is operated and the reading from the milliammeter M directly gives the percentage of contact dwell, since it cannot read the current.

(5) The valves of the recorder to be tested are in turn inserted into the appropriate sockets F, G and H. With the full scale deflection adjusted, the anode current is indicated on the milliammeter M. Operation of the switch Q enables both halves of double diodes and double triodes to be tested separately. Faulty valves or those having a thermionic emission which is too low can be replaced.

(6) The performance of the servo-system is tested by selecting an appropriate micro-voltage by means of the dial L. The micro-voltage required to (a) move the recorder and (b) bring the recorder to full response speed in both up-scale and down-scale direction is noted and compared with standard figures.

(7) The output from the constant voltage unit is connected to the socket S, and the selector switch R is set to the appropriate range. The socket T is coupled to the terminals W1 and W2 associated with the potentiometer. The potentiometer is standardized by pressing push button 122 and turning the knob 124 until the galvanometer Y reads zero. Next the dials Z1 and Z2 are set to 60 mv., the button 121 is pushed and the resultant voltage is then read off the millivolt potentiometer by adjusting the dials Z1 and Z2 until the galvanometer Y again gives a zero deflection.

(8) To calibrate the recorder, a voltage from the potentiometer is selected by means of dials Z1 and Z2 and fed to the recorder by means of a lead connected to terminals W1 and W2.

(9) The functional test is designed to test the complete working of the recorder up to a limit of 100 mv. and any number of channels up to twenty-four. For this purpose a multicore lead is plugged into the socket A and the other ends of the leads connected to the recorder terminal board. The lead connected to terminal 1 is the only negative lead and is looped to all other negative terminals on the recorder terminal board. The millivolt outputs from the leads increase in value as their numbers rise since the resistors R1 to R25 act as a potentiometer. With the switch D set to the fouth position and the switch E set to "normal," the terminal 25 is at 50 mv., while the terminal No. 2 is at 2 mv. With switch D in the third position the outputs are 25 and 1 mv. respectively. If a maximum of 100 mv. is required, the switch E is switched to its operative position so as to connect the battery 100 in circuit. The knobs B and C are adjusted to enable the millivolt range to be shifted up and down the scale to a convenient setting if required.

When testing multipoint recorders with fewer input channels than twenty-four, the unused leads in the multicore extension cable are stored in a lead housing device shown in FIGS. 9 and 10. The housing is made of a strong light nylon material and will stand up to hard usage in the field. This housing has twenty-six holes 130 through which the leads are passed. Those leads which are not used are merely pulled back so that the spade terminals are housed within the device and the spare wires looped and tied together. Strips 132 ensure that adjacent spade terminals do not short circuit one another.

It will be appreciated from the above description that the potentiometer recorder testing device is robust, compact, readily portable, very reliable and easy to operate. Its total weight is just under 20 lbs.

What I claim and desire to secure by Letters Patent is:

1. Portable testing equipment for testing the functioning of single and multi-point potentiometric recorders, comprising in combination:
    (a) a voltage divider having a plurality of outputs, all of which differ from each other in a defined known manner, the voltage range of these outputs covering the voltage range of the multi-point recorder to be tested;
    (b) means for varying the range of the voltage outputs of said divider;
    (c) a multi-lead cable, one end of each lead being connected to an output of the divider;
    (d) a housing provided at the other end of the cable for separately housing the other end of each lead, said housing being constructed so that the leads can be extracted therefrom for simultaneously connecting a desired plurality of outputs to the input channels of the recorder under test;
    (e) a micro-volt output device, the output of which is fed into the amplifier of the recorder for testing the servo-system of the recorder;
    (f) a tube tester for testing the electron emission of amplifier tubes used in the recorder under test;
    (g) a converter testing unit having a socket for receiving and testing the converter of the recorder for the percentage of contact dwell;
    (h) a contact pressure testing device which is demountable from the device for making a test;
    (i) a torque tester comprising a chuck, a dial and a memory needle;
    (j) a plurality of interchangeable torque bars, one of which is coupled to a suitable point of the recorder mechanism, the torque required for rotating the mechanism indicating the friction of the system; and
    (k) a constant voltage unit testing means comprising at least a pair of resistors, one being of larger value than the other, connected across the output from the constant voltage of the recorder, the values of the resistors being such that the voltage across the resistor of smaller value can be read by balancing a potentiometer with the aid of a galvanometer.

2. Potentiometric recorder testing equipment according to claim 1, wherein a valibrating device is incorporated, providing a range of standard voltages within the ranges of the recorders to be calibrated.

3. Potentiometric recorder testing equipment according to claim 1, wherein the tube tester comprises:
    (a) a plurality of different tube sockets in which the tubes of the recorder under test are inserted;
    (b) a milliammeter connected to the cathode terminal of each tube socket in order to test the thermionic emission of each tube of the recorder in turn;
    (c) means for adjusting the full scale deflection of the milliammeter before making the tube tests; and
    (d) a switch associated with the tube sockets for testing double diodes or double triodes, in order to test each half of the tube separately.

4. Potentiometric recorder testing equipment according to claim 1, wherein the converter testing unit includes a switch and a milliammeter so that the contact dwell of the left and right contacts can be determined according to the position of said switch.

5. Potentiometric recorder testing equipment according to claim 1, wherein the contact pressure testing device includes a finger for lifting a contact, a needle for indicating the load required to lift the contact and a memory needle for recording the load.

6. Potentiometric recorder testing equipment according to claim 1, wherein the torque tester includes a torque bar for coupling to the chart drive system of the recorder under test.

7. Potentiometric recorder testing equipment according to claim 1, wherein the constant voltage unit testing means includes a plurality of pairs of resistors and selecting means for selecting one pair of resistors, the pairs of resistors being chosen to cover the range of tests required for the recorder under test.

References Cited

UNITED STATES PATENTS

| 2,572,194 | 10/1951 | Poarch | 324—28 |
| 2,623,926 | 12/1952 | Elliott | 324—28 |
| 2,741,118 | 4/1956 | Ricciardi | 73—1 |
| 2,769,928 | 11/1956 | Emker | 324—74 XR |
| 2,903,643 | 9/1959 | Dobrovolny | 324—24 XR |

FOREIGN PATENTS

| 1,013,095 | 8/1957 | Germany. |
| 1,028,808 | 4/1958 | Germany. |

RUDOLPH V. ROLINEC, *Primary Examiner.*

E. L. STOLARUN, *Assistant Examiner.*

U.S. Cl. X.R.

73—1; 324—747